United States Patent [19]

Martin et al.

[11] 3,909,560

[45] Sept. 30, 1975

[54] METHOD AND SYSTEM FOR PROVIDING POWER TO BOOSTER AMPLIFIERS IN H.F. CABLE NETWORK

[75] Inventors: Helmut Martin, Hannover; Lothar Krisch, Misburg, both of Germany

[73] Assignee: Kabel- und Metallwerke Gutehoffnungshutte Aktiengesellschaft, Hannover, Germany

[22] Filed: Mar. 5, 1974

[21] Appl. No.: 448,265

[30] Foreign Application Priority Data

Mar. 5, 1973 Germany ............ 2310885

[52] U.S. Cl. ....... 179/170 J; 178/DIG. 13; 325/308

[51] Int. Cl.[2] ............ H04B 3/44

[58] Field of Search .......... 179/170 R, 170 J, 2.5 R; 325/308; 178/DIG. 13, DIG. 11

[56] References Cited

UNITED STATES PATENTS

| | | | |
|---|---|---|---|
| 2,006,994 | 7/1935 | Hopkins | 325/308 |
| 3,064,195 | 11/1962 | Freen | 325/308 |
| 3,368,031 | 2/1968 | Eisele | 325/308 |
| 3,435,358 | 3/1969 | Rheinfelder | 179/170 J |
| 3,535,474 | 10/1970 | Duimelaar | 179/170 J |
| 3,535,640 | 10/1970 | Forrest, Jr. | 325/308 |
| 3,543,163 | 11/1970 | Rheinfelder | 325/308 |
| 3,566,275 | 2/1971 | Schenfeld | 325/308 |
| 3,699,250 | 10/1972 | Bunting | 325/308 |

*Primary Examiner*—Kathleen H. Claffy
*Assistant Examiner*—Randall P. Myers
*Attorney, Agent, or Firm*—Ralf H. Siegemund

[57] ABSTRACT

A network for transmitting high-frequency energy via cable from a source to multiple users at different locations. The network is organized in several levels including a primary level, into which the h.f. energy is fed and secondary and lower levels branching off the primary level, and wherein booster amplifiers are included in the network, each being associated with one of a plurality of power regulating units for powering the respective amplifier with regulated d.c.; a plurality of d.c. power supply means units are provided at several different, spaced apart locations of the network, each for providing d.c. voltage to several of said power regulating units and over a portion of the network, covering a distance therein significantly smaller than the network as a whole. D.c. supply current is prevented from flowing from a secondary level into the primary level.

2 Claims, 4 Drawing Figures

METHOD AND SYSTEM FOR PROVIDING POWER TO BOOSTER AMPLIFIERS IN H.F. CABLE NETWORK

BACKGROUND OF THE INVENTION

The present invention relates to a method and system for transmitting electrical high-frequency energy via a cable network.

The transmission of high-frequency signals via cable is, for example, used in cable TV networks. Such networks are usually organized in four levels. The first and principal or primary level provides for transmission of signals by about 5 km (about 3 miles) or thereabouts, and about ten booster amplifiers are provided along that path. Secondary levels can be deemed to branch off the main level, each providing for a transmission over about 1 km and using e.g., three booster amplifiers for the signal. In the third, tertiary or sedcond order secondary level, passive operation is provided for, covering at the most about 150 m (or about 500'). The fourth and final levels branch from the tertiary levels or constitute an extension thereof to provide for the connection to the individual subscriber, constituting the user and final destination of the signal.

The separation of the several portions of the network into multiple levels is not only a convenient mode of describing the system, but is established in reality for accommmodating many users and points of destination, independently from the number of such users served in that manner. The transmission of such TV signals employs a frequency band e.g., up to 300 megahertz; cable TV may actually use e.g., 30 to 300 MHz, while the lower frequencies are used otherwise e.g., video telephones etc. Satisfactory transmission of h.f. signals through such a system requires that the signals are maintained above a minimum level; that is the purpose of the amplifiers.

The on-line powering of these amplifiers poses significant problems, because electrical power is just not independently available at any location along the h.f. cable network, where amplifiers have to be inserted. Either the cable itself or a parallelly running cable can be used to feed the necessary electrical energy to the amplifiers as distributed throughout the system. Thus, a.c. energy can be fed to the amplifiers via the above-mentioned primary level. However, feeding a.c. through the cable has the disadvantage that feeding a.c. is restricted to a single supply source point, because in the case of plural sources, exact phase synchronism would have to be established everywhere. Moreover, there still would be the danger of short circuits. Another drawback of a.c. feeding is that the power transformers in the amplifiers must be matched to the locally existing voltage, unless the transformer input voltage is selelcted to be sufficiently high. In either case, efficiency is low and noise may become excessive. Moreover, high voltages endanger personnel working on the cable for one reason or another.

Alternatively, one could use a d.c. voltage for feeding the amplifiers, with central feeding of d.c. current in the primary level. However, one has to use here either high voltages or rather thick cables or both.

SUMMARY OF THE INVENTION

It is an object of the present invention to provide for a method and system permitting transmission and distribution of high frequency signals via such a network at a high efficiency, which is substantially independent from the level of the voltage supply for the amplifiers.

It is another object of the present invention to power the amplifiers in a h.f. distribution network with as small a voltage as feasible and through conductors with small cross-sections.

It is another object of the present invention to provide for the necessary power supply of amplifiers in a h.f. cable network independently from other, available or unavailable electrical power sources, lines or mains.

It is, therefore, a specific object of the present invention to improve the transmission of high-frequency signals via a network which includes, possibly, many amplifiers for boosting the signal level along its path from its source to many different, widely spaced user outlets.

In accordance with the preferred embodiment of the invention, it is suggested to feed the amplifiers of the system with locally regulated d.c. derived from a d.c. power regulator associated with the amplifier. The d.c. is fed into the network at many different, spaced apart points along the network and its branches and at a rather low voltage level, so that each d.c. source feeds only a few of these amplifiers, obviating the need for extensive d.c. transmission paths.

The local voltage regulating and supply unit compensates for changes in the d.c. supply due to, for example, load changes or the like. Local regulation of a d.c. supply voltage fed to the cable, not too far from the location of an amplifier, permits utilization of small conductor cross-sections for the feed part of the cable. Moreover, multiple feeder and feed points for d.c. in the system render the supply system independent from drop-out of any of the supply sources; the others can readily take over with little loss in efficiency.

DESCRIPTION OF THE DRAWINGS

While the specification concludes with claims particularly pointing out and distinctly claiming the subject matter, which is regarded as the invention, it is believed that the invention, the objects and features of the invention and further objects, features and advantages thereof will be better understood from the following description taken in connection with the accompanying drawings, in which:

Proceeding now to the detailed description of the drawings, FIG. 1 shows a TV signal transmitting station 1 feeding its signals into a cable network. Multiple users each are indicated by blocks 2, representing, for example, individual homes connected to the cable TV system.

Figure 1:
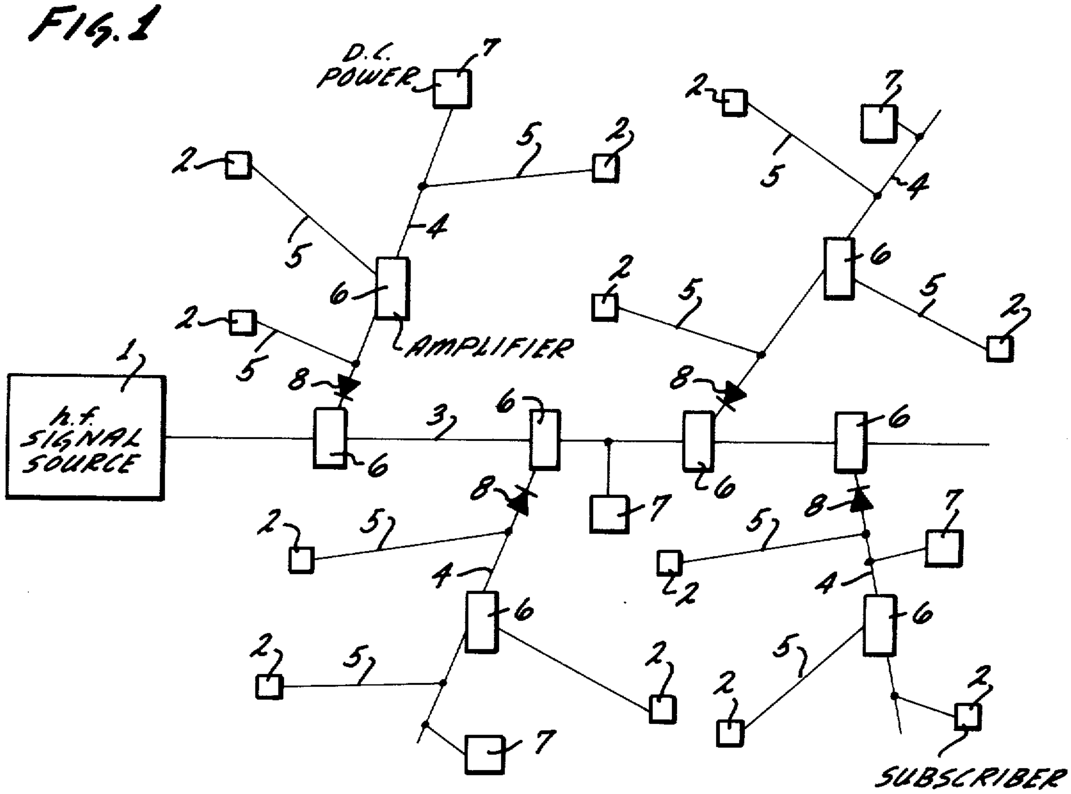
FIG. 1 illustrates schematically a cable TV network improved in accordance with the present invention.

The transmitting network is organized in levels as outlined above. The first or primary level is a transmission cable 3 with amplifiers placed at least in those points, where cables and transmission paths branch off for establishing the secondary levels 4. In other words, amplifiers provide boosted signal for feeding them from the main level into the branches establishing secondary levels. The cables for the tertiary levels 5 branch off the secondary levels, also at amplifiers 6 in some instances, but not necessarily in all cases; the fourth levels are established by the users 2.

The transmission of the h.f. signal along primary level path 3; the branch-off into the secondary levels and the transmission therethrough; and the branch-off into the tertiary levels are all boosted by amplifiers 6. Amplifiers are not found along and in the tertiary and final user levels.

The amplifiers are fed with power from d.c. supply sources 7, strategically distributed in the system. These sources 7 may be rectifiers with input transformers connected to the mains or the a.c. supply system of the area whereever such connection can be conveniently made. The d.c. level established by the sources 7 may be quite low, well below 100 volts. Each source 7 is provided to feed some or a few of the amplifiers 6, covering a portion of the network in each instance, whose length is significantly below the length of the entire network and cable system. There will be fewer sources 7 than there are amplifiers in the system, but still many d.c. feed points are provided for the four level network.

In order to make sure that a line fault, e.g., a short circuit in one of the secondary or still lower levels or a power failure in the levels below the primary level does not propagate into the primary level, diodes 8 are provided and connected at such a polarity that current can flow into but not from the primary level, cable 3, into the secondary and lower levels.

Figure 2:
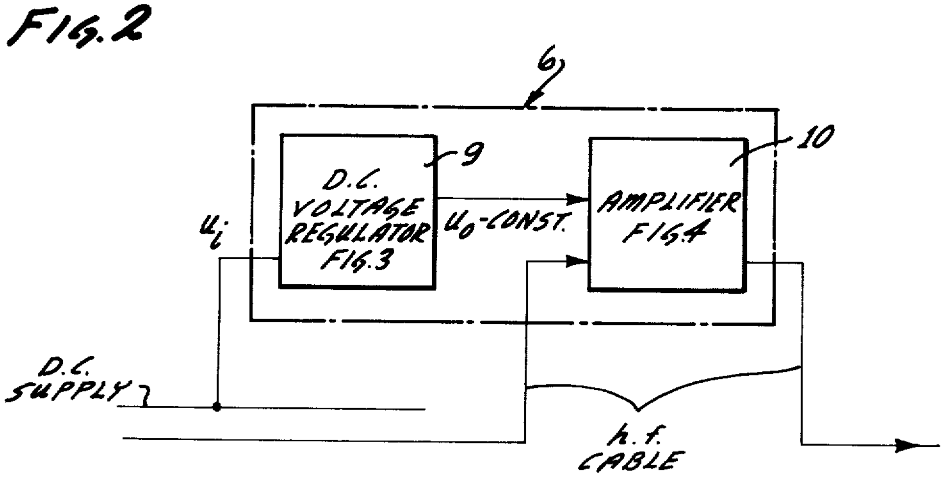
FIG. 2 shows schematically one of the many amplifiers in the system of FIG. 1.

As can be seen from FIG. 2, the amplifier 6 is comprised of a power supply and regulator 9 and the amplifier proper 10. Supply 9 provides regulated, constant d.c. voltage $u_o$ to the amplifier 10. The power supply 9 taps unregulated d.c. voltage $u_i$ but at generally the same or a higher level, from the cable. The supply 9 provides power at a constant level to the amplifier, independently from variations of $u_i$.

The FIG. 2 shows a h.f. signal cable line (which may pertain to any of the cables for levels 3 or 4) and a separate d.c. supply cable or line. The two cables, however, could be physically combined.

Figure 3:
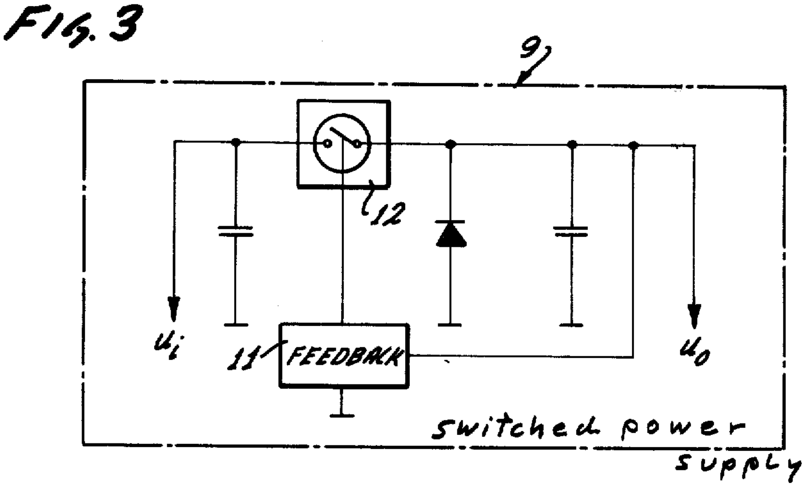
FIG. 3 is a circuit diagram for a power supply for the amplifier of FIG. 2.

FIG. 3 illustrates the regulated power supply in some detail. The main active element is an electronic switch 12, for example a power transistor, operated by a control unit 11, which monitors the output voltage $u_o$. Such units are actually available in commerce as power pack units. In conjuction with capacitors and a diode, such switching transistor provides regulated d.c. at a constant level independently from variations in the input voltage $u_i$, by connecting the line holding $u_1$ to the output line providing $u_o$ or disconnecting the lines in response to the feedback control 11 as operating transistor switch 12.

Figure 4:
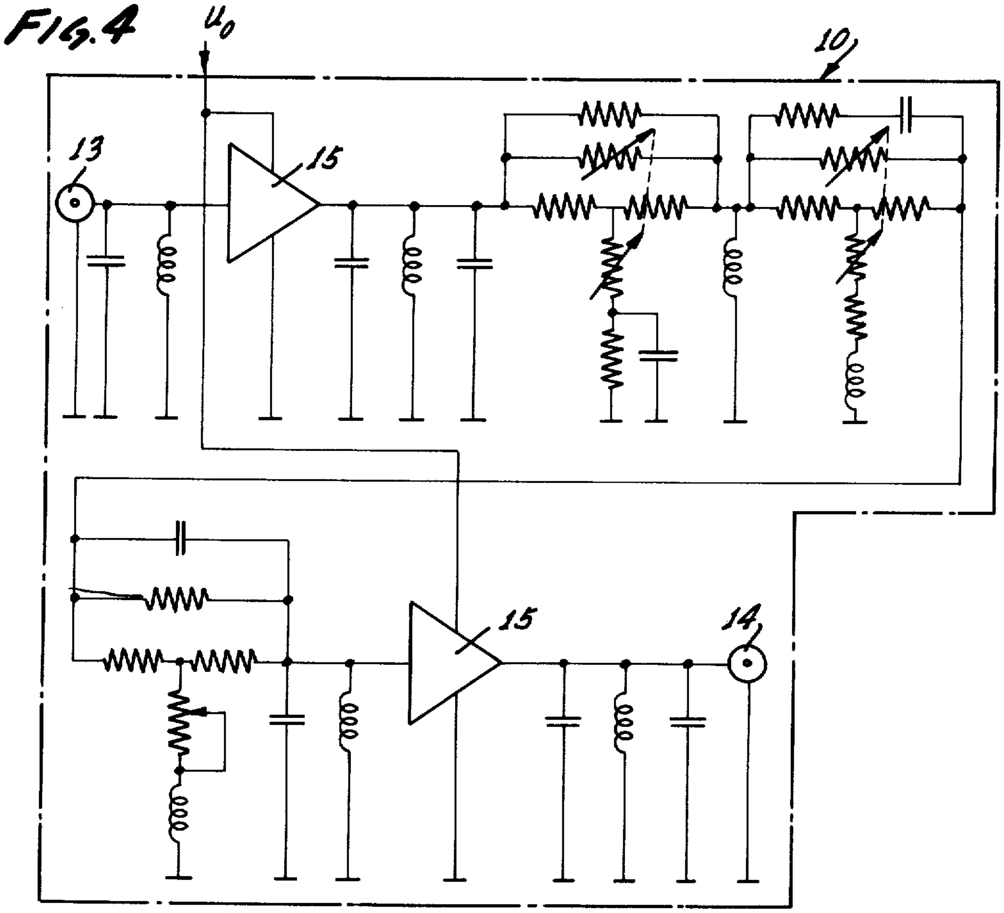
FIG. 4 is a circuit diagram for the amplifier itself.

The FIG. 4 shows a typical h.g. booster amplifier 10 with two active stages and to be used in a unit 6. The amplifier includes basically two integrated circuit amplifier elements 15, interconnected by coupler circuitry. Reference numerals 13 and 14 respectively denoted the coaxial input and output connection by means of which the amplifier is inserted in any of the cables of the network.

The invention is not limited to the embodiments described above, but all changes and modifications thereof not constituting departures from the spirit and scope of the invention are intended to be included.

We claim:

1. In a network for transmitting high frequency signals via cable from a source to multiple users at different locations, the network being organized in several levels including a primary level, into which the h.f. signals are fed, secondary levels branching off the primary level, and lower levels including user levels branching off the secondary levels and into which the signals are to be distributed, and wherein booster amplifiers for the h.f. signals are included in the network, comprising:

a plurality of power regulation units respectively individually associated with and connected to said amplifiers for powering the respective amplifier with regulated d.c. and constructed for connect-disconnect switching as between the d.c. supply line of the network the respective amplifier; and a plurality of d.c. power supply means smaller in number than the plurality of units, and each for feeding d.c. into the network, the power supply means of the plurality being located at several different, spaced apart locations along the network so that d.c. is fed into the network at the said different and spaced apart locations whereby each said power supply means provides a d.c. voltage to several of said power regulation units, and each said power supply means provides electric power for amplifiers in a portion of the network accordingly and over a distance in the network signficantly smaller than the network as a whole; and means included in the network for preventing d.c. supply current from flowing from a secondary level into the primary level, each secondary level connected to at least one of said supply means of the plurality, the primary level connected separately to at least one of said supply means.

2. In a method for transmitting and distributing high-frequency energy via an electrical cable network constructed on a multi-level basis with a primary level into which is fed a h.f. signal and from which branch secondary levels from which in turn branch lower levels including end-user levels, the network having booster amplifiers inserted, for boosting the h.f. energy from its source to the multiple users as connected to the network, comprising the steps of feeding each amplifier with regulated d.c. for operation thereof under utilization of local d.c. voltage regulators respectively individually associated with the amplifier;

feeding d.c. into the network at several different points, distributed over the entire network, at least one per secondary and primary levels but smaller in number than the number of booster amplifiers; and preventing d.c. supply current from flowing from a secondary level into the primary level.

* * * * *